Patented Sept. 20, 1932

1,878,390

UNITED STATES PATENT OFFICE

REGINALD GEORGE FRANKLIN, OF BILLINGHAM, STOCKTON-ON-TEES, ENGLAND, ASSIGNOR TO IMPERIAL CHEMICAL INDUSTRIES LIMITED, OF LONDON, ENGLAND, A BRITISH COMPANY

PRODUCTION OF METHANOL AND OTHER OXYGENATED ORGANIC COMPOUNDS AND PREPARATION OF CATALYSTS THEREFOR

No Drawing. Application filed November 21, 1927, Serial No. 234,917, and in Great Britain December 23, 1926.

This invention relates to the production of catalysts suitable for the hydrogenation of carbon monoxide to methanol and other organic compounds. Catalysts comprising zinc oxide or mixtures of zinc and chromium oxides are already known in this art, but I have found that such catalysts are particularly effective when they are prepared in a special way by heating mixtures containing combined carbon dioxide i. e. basic carbonates. According to the present invention I adopt a method for the production of the above catalysts which includes the step of heating a mixture containing zinc and chromium in the form of carbonates. Mixtures of oxides prepared as such do not come within the scope of the invention.

The basic carbonates employed according to this invention are referred to as compounds for the sake of brevity; the invention does not depend upon their existence as true compounds but upon the nature of the starting materials for their preparation, upon the proportions of the ingredients and upon the method of preparation.

Compounds such as $5ZnO.2CO_2.4H_2O$; $ZnCO_3.7ZnO.2H_2O$; $ZnCO_3.3ZnO.2H_2O$; $ZnCO_3.2ZnO.2H_2O$; $ZnCO_3.ZnO.H_2O$ and the like are very suitable as a source of the zinc part of the mixed catalyst, while basic chromium carbonates such as $4Cr_2O_3.CO_2.H_2O$; $2Cr_2O_3.CO_2.6H_2O$; $10Cr_2O_3.7CO_2.8H_2O$; $Cr_2O_3.CO_2.4H_2O$ and $Cr_2O_3.2CO_2$ may supply the chromium part (see Mellor "A comprehensive treatise on inorganic and theoretical chemistry" 1923, vol. 4, pp. 645–646; Friend: "Textbook of Inorganic Chemistry" 1926, vol. 7, part 3, page 95.

According to this invention zinc carbonate may be mixed with chromium carbonate, or the carbonates may be coprecipitated.

The composition of matter containing the carbonates is then subjected to heat and is thereby converted into the improved catalyst.

The compounds are usually prepared by precipitation, the precipitates being well washed and dried and preferably pelleted before introduction into the catalytic apparatus. In the preferred form of my invention I prepare a catalyst containing both zinc and chromium substantially all in the basic carbonate state.

The following examples illustrate the method of preparation of my improved catalysts.

Example 1

A strong solution of sodium bichromate or chromate is mixed with sulphuric acid and the hot mixture (90° C.) is heated with granulated zinc metal to effect reduction of the bichromate to chromium sulphate. When the reduction is finished a solution of soda ash (5–10 per cent excess) is added; the precipitate thrown down consists of a mixture of basic zinc and chromium carbonates, which is separated, washed well with hot water and dried. It is then made into pellets and introduced into the catalytic apparatus.

In this preparation the exact composition of the precipitate as regards the basicity of the carbonates depends upon many factors, such as concentration of solutions, temperature and amount of soda ash added. I prefer to proportion the zinc and chromium so that the precipitate contains 70–80 moles of zinc to 30–20 moles of chromium. In some cases the amount of zinc may not be sufficient to effect reduction of all the chromium and addition reducing agents may then be used e. g. $SO_2$.

Example 2

A solution of bichromate in aqueous sulphuric acid is placed as electrolyte in a cell having a zinc negative pole and a carbon positive pole. By taking current from the cell the bichromate is reduced and the spent electrolyte eventually contains the requisite amount of zinc and chromium sulphate for the precipitation with soda ash, which follows as before. This method of preparation has the advantage that the free energy of the reactants is made to manifest itself as useful electrical energy instead of as heat. The zinc electrode may also be amalgamated to prevent direct attack by the acid.

Example 3

Basic chrome liquor of commerce, which consists of a solution of chromium sulphate made by reduction of chromates by $SO_2$ or by molasses, is used as a source of chromium. A suitable amount of zinc sulphate is added to the liquor and the mixed basic carbonates precipitated as before.

Catalysts prepared according to this invention are capable of yielding direct methanol of a high degree of purity. If alkali salts are allowed to remain in the catalysts, or if separate additions of such are made, they become suitable for the production of higher alcohol. When, through poisoning, these catalysts, become less efficient, they may be regenerated either by heating to 300–400° C. in a current of air or oxygen, or by dissolving up in sulphuric acid and reprecipitating the complex carbonates with soda ash.

I declare that what I claim is:—

1. Method of preparing a catalyst containing zinc and chromium oxides for the production of methanol and other oxygenated organic compounds which comprises heating to decomposition a mixture of zinc and chromium carbonates.

2. Method of making catalysts containing zinc and chromium oxides which includes the step of heating to decomposition a composition containing zinc and chromium carbonates obtained by co-precipitating the mixed carbonates from solution.

3. Catalyst containing zinc and chromium oxides for the production of oxygenated organic compounds obtained by heating to decomposition a mixture of zinc and chromium carbonates.

In witness whereof, I have hereunto signed my name this 3rd day of November, 1927.

REGINALD GEORGE FRANKLIN.